Oct. 18, 1966  S. GOLDEN  3,279,245
TRANSDUCER
Filed Oct. 4, 1963

INVENTOR.
SIDNEY GOLDEN
BY
Ezekiel Wolf, Wolf & Greenfield
ATTORNEYS

United States Patent Office 3,279,245
Patented Oct. 18, 1966

3,279,245
TRANSDUCER
Sidney Golden, 31 Winchester Drive, Lexington, Mass.
Filed Oct. 4, 1963, Ser. No. 313,938
6 Claims. (Cl. 73—141)

This invention relates to transducers and more particularly comprises a new and improved transducer which utilizes a substantially unconfined liquid mass as the sensing medium.

The ease with which unconfined liquids change their shape under forces applied to them makes them inherently suitable as a sensing medium in a wide variety of transducers. Heretofore, however, no one has discovered how to implement this characteristic of liquids by embodying a substantially unconfined liquid into a device to produce an instrument having a large intrinsic sensitivity.

The use of a liquid as the sensing medium has many other advantages. For example, because the liquid may comprise essentially the only moving part of the device, the instrument may have a long, trouble-free operating life. By the selection of a suitable liquid, the device may be designed to operate over a wide range of temperatures. The elastic flexure of the components of the device may be small without affecting the performance of the device, because sensitivity is primarily dependent upon displacement of the liquid and not necessarily upon distortion of a diaphragm, bellows, strain tube, etc., used in conventional devices. Furthermore, because of the inherently high sensitivity of a device employing liquid as the sensing medium and limited strength restrictions imposed by the limited elastic flexure of its other components, the device may be made extremely small so as to be suitable for use in places where severe size limitations exist.

One important object of this invention is to provide a transducer which utilizes the inherent advantages of a liquid as the sensing medium.

Another important and more general object of this invention is to provide a transducer having high sensitivity, a wide range of applications, great strength, long life and good stability.

To accomplish these and other objects the transducer of this invention includes a liquid mass in contact with a non-wettable surface. The liquid is in contact with the surface in a manner so that the area of contact between the surface and the liquid mass is free to change as a function of the surface tension of the liquid and the force applied to the liquid. Means are operatively connected to the liquid for rendering a signal which is a function of the shape of the liquid mass.

These and other objects and features of this invention along with its incident advantages will be better understood and appreciated from the following detailed description of several embodiments thereof, selected for purposes of illustration and shown in the accompanying drawings, in which.

A basic property of liquids upon which this invention depends is the tendency of liquids under certain conditions to assume a shape in which the liquid mass has a more or less minimum surface area. The liquids used in the present invention exhibit a tendency to assume some particular shape depending upon the extent of confinement incorporated into the design of the device, and upon assuming that shape these liquids achieve equilibrium. Once equilibrium is achieved the application of an external force is necessary to alter the shape of the liquid mass and its surface area. Thus, a droplet of water free of contact with any confining member will in the absence of any gravitational forces, assume a spherical shape due to its surface tension and the shape will remain unchanged until a force is applied to it. This phenomenon is simply illustrated in FIGS. 1 and 2.

Figure 1:
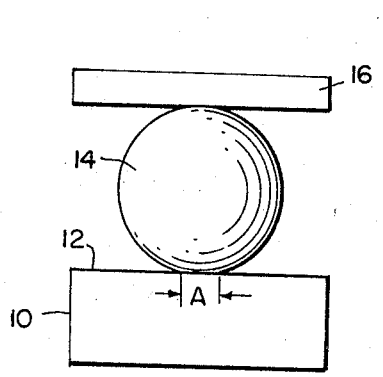
FIGS. 1 and 2 are diagrammatic views illustrating the concept employed in the sensing device of this invention.
Figure 2:
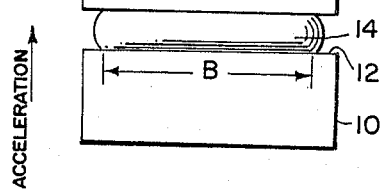

In FIG. 1 a block 10 is shown to support on its upper horizontal surface 12 a droplet of liquid 14 above which is disposed a movable plate 16. In the absence of a downward force applied to plate 16, the droplet 14 will assume a shape which is spherical if the block 10 and plate 16 are made of a material which is nonwettable by the liquid 14. In FIG. 2, the effect on the liquid 14 of a downward force applied to the plate 16 is shown. While the liquid 14 in FIG. 1 has a very small area of contact A with the surface 12 (theoretically merely a point of contact), force applied to the plate 16 causes the area of contact to increase substantially, as shown in FIG. 2 at B. The area of contact in FIG. 2 is not larger than B because the force applied by the plate 16 to the liquid 14 is opposed by the surface tension of the liquid. Because many of the properties of the liquid as well as many of the properties of the combined structure including the plate 16, liquid 14 and block 10 change with changes in the shape of the liquid, it will be appreciated that the liquid 14 in the form of an unconfined droplet can be used as the sensing medium to measure the force applied to the plate 16. It should be appreciated that the force applied to the liquid may come from other than a force applied to the plate 16. Thus, the force could arise from an acceleration of the block 10 and liquid 14. If the liquid and block were accelerated in an upwardly direction as viewed in FIGS. 1 and 2, the liquid would experience the same change in shape as shown and described as resulting from a force F directed downwardly on the plate 16.

Figure 3:
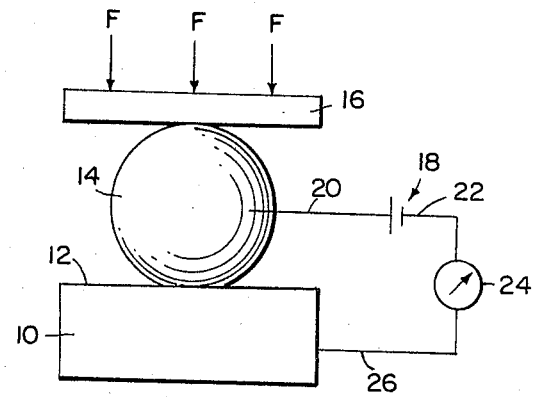
FIG. 3 is a view similar to FIG. 1, diagrammatically illustrating the manner in which this invention may be embodied in a force transducer.

These principles are employed in the embodiment of this invention shown in FIG. 3 wherein the mutual area of contact of the liquid and its supporting surface is the determining aspect of the resistance in the measuring circuit 18.

The electrical resistance of a material is affected by the cross-sectional area of the material through which electrical current flows. Thus, for a fixed temperature, length and composition, the resistance of a cylindrical material to electrical current moving along its axis varies inversely with the cross-sectional area of the cylindrical material. Even when the conducting material is not of a simple shape, the cross-sectional area in certain regions is a determining aspect of its resistance. In the simple mechanism diagrammatically represented in FIG. 3, the circuit includes a probe 20 connected through a power source 22 and ammeter 24 to a second probe 26. Probe 20 is in electrical communication with the electrically conducting liquid mass 14 while the probe 26 is electrically connected to the electrically conducting block 10. It is evident that when the area of contact between the liquid 14 and the surface 12 of the block 10 is large, that determining aspect will exhibit a relatively small electrical resistance in the circuit 18, and therefore the current flowing through the circuit as measured by the meter 24 will be relatively large. Alternatively, when the area of contact between the liquid and the surface 12 of the block is small, as shown in FIG. 3, the electrical resistance in the circuit will be relatively large and the current measured by the ammeter 24 will be small. Because the area of contact between the liquid mass and the surface 12 is a function of the force applied to the plate 16, it is evident that the device shown in FIG. 3 may serve as a simple force gage with the plate 16 serving as the pick-up, the liquid 14 serving as the sensing medium and the ammeter 24 serving as the indicator.

The range and sensitivity of the device shown in FIG. 3 depend at least in part upon the nature of the materials used. Preferably either the liquid mass 14 or the block 10 is made of a conductive material while the other is resistive in nature. As an example of the materials which may be used, it is suggested that the liquid be an electrolytic aqueous solution and the solid be an organic semiconductor which is not wettable by the liquid. As another example the liquid may be mercury and the block may be a semiconductor which is not wet by the mercury.

Figure 4:
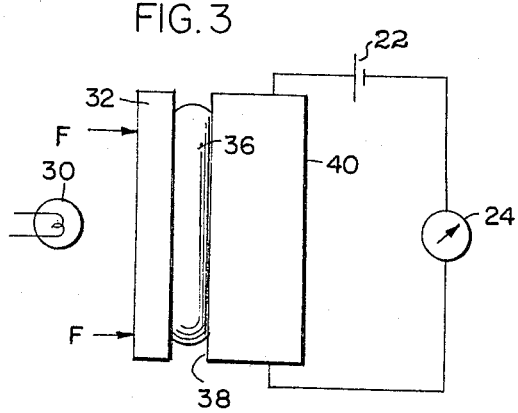
FIG. 4 is a diagrammatic view illustrating another embodiment of a force transducer in accordance with this invention.

While the embodiment of FIG. 3 depends upon the change in resistance of the contacting area to render the force measurement, in the embodiment of FIG. 4 the amount of light transmitted by the liquid is employed as the critical parameter to render the measurement. In the arrangement shown, a light source 30 is disposed adjacent the plate 32 made of a transparent material such as glass, which moves in response to a force applied to its surface 34 to change the shape of the liquid mass 36 disposed on the surface 38 of the fixed block 40 made of a photo-conductive material. The signal generated by the block 40 is a function of the light which reaches it through the liquid 36, and the light transmitted by the liquid is a function of the thickness of the liquid mass between the surface 38 and plate 32. The meter 24 and power source 22 may be provided in the circuit with the block 40 to make the actual measurement. As in the previous embodiment the force applied to the surface 34 of the plate 32 is opposed by the surface tension of the liquid mass 36.

Figure 5:
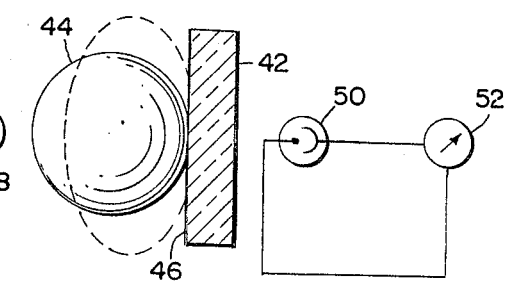
FIG. 5 is a diagrammatic view illustratilng this invention embodied in an accelerometer.

In FIG. 5 yet another embodiment of this invention is shown, capable of measuring acceleration. As illustrated, the device includes a transparent plate 42 and a translucent liquid mass 44 in contact with the surface 46 of the plate 42. Obviously the amount of light transmitted through the liquid from the light source 48 to the photocell 50, and the signal generated by the photocell and indicated by the meter 52 will be a function of the shape of the liquid mass. It is also evident that in response to acceleration to the left as viewed in the drawing, the liquid mass 44 will change in shape from that approximated in full lines, to that approximated in broken lines in the figure. Consequently, the signal measured by the meter will be a direct function of the acceleration sensed by the liquid, and no special materials are required for the liquid mass and plate.

Figure 6:
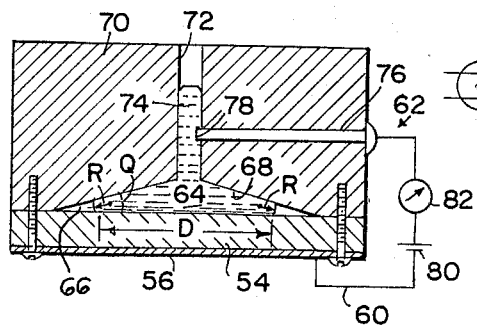
FIG. 6 is a cross-sectional view illustrating this invention embodied in a pressure transducer.

FIGS. 3–5 illustrate diagramatically how, in accordance with the present invention, a liquid mass confined in only a limited manner may serve as a sensing medium. FIG. 6 shows in greater detail one practical application of this invention in a gage. In FIG. 6 a block 54 is made of silicon and has a metallic coating 56 sputtered on its lower surface 58 to which is connected one terminal 60 of the measuring circuit 62. Formed above the silicon block 54 is an inverted cone-shaped cavity 64 having a large diameter-to-height ratio so that the angle of convergence Q is relatively small. The cavity 64 is defined in part by the upper surface 66 of the block 54 and by a cone-shaped recess 68 provided in the bottom of a second block 70 disposed above the block 54 and in contact with the surface 66 about its periphery. A vertical passage 72 extends through the block 70 and communicates with the chamber 64 at its apex. The cavity 64 previously evacuated to a pressure considerably less than the lower limit of the range of pressures for which the gage is designed, contains a mass of mercury 74 which extends upwardly into the passage 72. A second terminal 76 forming part of the circuit 62 is embedded in the upper block 70 and has its end 78 within the column of mercury in the passage 72. The terminals 60 and 76 are connected to a power source 80 and a meter 82 for measuring the current which flows in the circuit.

The area of contact D between the mercury in the cavity 64 and the upper surface 66 of the block 54 is a function of the surface tension of the liquid mercury, the pressure on the top of the column of mercury in the passage 72 and the pressure developed in the previously evacuated cavity 64. The surfaces tension of the liquid and more particularly the forces generated by the surface tension oppose the pressure applied to the column and cause the mercury to achieve equilibrium with a constant area D when the pressure stabilizes. The forces generated by the surface tension are a function of the reciprocal of the radius of curvature R of the liquid measured in the plane of angle Q. (The radius of curvature of the liquid measured in the plane of surface 66 is so large as compared to radius R that it may be ignored.) Because the surface tension as well as other of the parameters of the instrument are merely a matter of design and remain fixed once the instrument is made, the area of contact D will bear a direct functional relationship with the pressure on the column. Accordingly, this device may be used as a pressure gage, and the pressure may be read directly by specially calibrating the meter 82.

The range of the instrument may be varied by varying the angle Q of the cavity. The greater the angle, the smaller will be the resistance to changes in area D with changes in pressure on the column. When the angle is very small, resistance to changes in area will be increased, and very high pressure measurements may be achieved.

The embodiments shown in FIGS. 3–6 are primarily illustrative of the basic concept of this invention, which is the use of the surface tension of liquids in combination with a non-wettable surface to provide a controllable area of contact between the liquid and the surface. In each embodiment equilibrium is achieved by the variations in the curvature of the liquid surface which, because of the surface tension of the liquid, establishes internal forces in the liquid to oppose the externally applied forces. Thus, in each illustrated embodiment, the variable sensed by the device is transposed into a radius of curvature on the surface of the liquid mass, and the indicator of the device in turn produces an indication of that radius. That is, any property of the liquid or the system which is a function of the radius of curvature such as area of contact, resistance, photoconductivity, optical absorption, capacitance, etc., may be utilized to provide a measurement of the force applied to the liquid and/or the distance between two surfaces separated by the liquid and/or their relative displacement. The embodiments shown are merely illustrative of this principle, and numerous embodiments of this invention will immediately occur to those skilled in the art upon a reading of the foregoing specification.

For example, the surface in contact with the liquid need not be horizontal. The embodiment of FIG. 6 is not dependent for operability upon the specific orientation of the device. Moreover, in the absence of gravitational and acceleration forces the surface 12 in the embodiment of FIG. 3 could be disposed in any position. Therefore, it is not intended that the breadth of this invention be limited to any of the instruments specifically illustrated and described. Rather, it is intended that the scope of this invention be determined by the appended claims and their equivalents.

What is claimed is:
1. A transducer comprising
   a resistive member having a surface,
   a conductive liquid which does not wet the surface in contact with the surface of the resistive member and restrained on the surface by the surface tension forces of the liquid, means operatively associated with the liquid for varying the surface tension forces, and means including a meter connected across the liquid and the member and responsive to the combined resistance of the member and the liquid for rendering a measurement of the first recited means.

2. A transducer comprising means defining a surface member, a liquid member in contact with the surface member, the area of contact between the liquid member and the surface member being variable and being basically dependent on the surface tension forces of the liquid member, said surface tension forces being a function of the force applied externally to the liquid, means mechanically coupled to the liquid member for changing the externally applied force, and means responsive to a property of one of the members which varies with changes in the surface tension forces for measuring externally applied force.

3. A force transducer comprising means defining a surface, a liquid mass which does not wet the surface in contact with said means defining a surface and with the area of contact between the liquid mass and the surface being basically dependent on the surface tension forces of the liquid, said liquid being exposed to variable externally applied forces which vary the surface tension forces, and means operatively connected to the liquid and sensitive to a property of the device bearing a functional relationship to the surface tension forces for indicating a change in the externally applied forces.

4. A force transducer comprising a liquid mass in contact with a surface and with the area of contact between the liquid mass and the surface being basically dependent on the surface tension forces of the liquid, said liquid being exposed to variable externally applied forces, and means including an electrical circuit including as part thereof the area of contact between the liquid and the surface and rendering a signal which is a function of said area.

5. A device comprising means defining a surface, a liquid mass which does not wet the surface disposed on and having an area of contact with the surface and free to move over the surface except as it is restrained by the surface tension forces of the liquid mass, means operatively associated with the liquid mass for varying the surface tension forces of the liquid mass, and means operatively connected to the liquid and rendering a signal which is a function of surface tension forces of the mass.

6. A device comprising means defining a nonwettable surface, means including the surface defining a cavity having side walls which converge in a direction away from the surface, a liquid disposed in and partially filling the cavity and in contact with the surface and the side walls, the area of contact of the liquid on the surface being basically dependent on the surface tension forces of the liquid, means for applying external forces to the liquid in the cavity for varying the area of contact between the surface and the liquid, and means connected to the device for rendering a signal which is a function of the area of contact.

References Cited by the Examiner
UNITED STATES PATENTS

| | | | |
|---|---|---|---|
| 2,054,438 | 9/1936 | Natelson | 73—53 |
| 2,566,369 | 9/1951 | Putman | 338—38 |
| 2,740,028 | 3/1956 | Buckman | 338—44 |
| 2,938,390 | 5/1960 | McFee | 73—516 |
| 3,020,506 | 2/1962 | Remington et al. | 338—86 |
| 3,096,656 | 781963 | Jackson | 73—517 |
| 3,121,336 | 2/1964 | Riordan | 73—516 |

RICHARD C. QUEISSER, *Primary Examiner.*

CHARLES A. RUEHL, *Assistant Examiner.*